United States Patent
Heyne et al.

(10) Patent No.: US 9,175,997 B2
(45) Date of Patent: Nov. 3, 2015

(54) SELF-MONITORING FLOW MEASURING ARRANGEMENT AND METHOD FOR ITS OPERATION

(75) Inventors: Richard Heyne, Muesbach-le-haut (FR); Michael Moellgaard, Liestal (CH)

(73) Assignee: Endrsess + Hauser Process Solutions AG, Kagenstr., Reinach (CH)

( * ) Notice: Subject to any disclaimer, the term of this patent is extended or adjusted under 35 U.S.C. 154(b) by 534 days.

(21) Appl. No.: 13/505,826

(22) PCT Filed: Sep. 7, 2010

(86) PCT No.: PCT/EP2010/064996
§ 371 (c)(1),
(2), (4) Date: May 3, 2012

(87) PCT Pub. No.: WO2011/061005
PCT Pub. Date: May 26, 2011

(65) Prior Publication Data
US 2012/0216600 A1    Aug. 30, 2012

(30) Foreign Application Priority Data
Nov. 17, 2009    (DE) .......................... 10 2009 046 758

(51) Int. Cl.
*G01M 3/28*    (2006.01)
*G01F 1/00*    (2006.01)
(Continued)

(52) U.S. Cl.
CPC .......... *G01F 15/005* (2013.01); *G01F 25/0007* (2013.01); *G01M 3/2807* (2013.01)

(58) Field of Classification Search
CPC ......... G01M 3/28; G01M 3/2807; G01F 1/00; G01F 15/005
USPC ...................................................... 73/40.5 R
See application file for complete search history.

(56) References Cited

U.S. PATENT DOCUMENTS
2008/0163936 A1    7/2008    Boger et al.

FOREIGN PATENT DOCUMENTS
DE    2324603        11/1974
DE    3242750 A1    5/1984
(Continued)

OTHER PUBLICATIONS
Machine Translation of the description of EP 0646781 published Sep. 1994, three pages.*
(Continued)

*Primary Examiner* — Daniel S Larkin
(74) *Attorney, Agent, or Firm* — Bacon & Thomas, PLLC

(57) ABSTRACT

Self-monitoring flow measuring arrangement includes a pipeline system flowed through by a medium, a control device installed in the pipeline system on the inlet-side, which varies a flow rate of the total medium flowing into the pipeline system according to a predetermined time-dependent periodic change profile; at least one flow measuring device installed in the pipeline system, which is located at a measuring location, which is located downstream of the control device in the flow direction, and through which the entire medium flowing through the pipeline system flows, and which measures the flow rate ($Q_5(t)$, $Q_{5a}(t)$ $Q_{5b}(t)$, $Q_{5c}(t)$ $Q_{5d}(t)$, $Q_{5e}(t)$) of the medium at the measuring location; and a monitoring unit, which, based on the predetermined time-dependent change profile and the flow rates measured at the measuring locations ($Q_5(t)$, $Q_{5a}(t)$, $Q_{5b}(t)$, $Q_{5c}(t)$, $Q_{5d}(t)$, $Q_{5e}(t)$), monitors whether the measured flow rates ($Q_5(t)$ $Q_{5a}(t)$, $Q_{5b}(t)$, $Q_{5c}Q_{5d}(t)$, $Q_{5e}(t)$) follow the predetermined time-dependent change profile, and outputs an error report, when at least one of the measured flow rates ($Q_5(t)$, $Q_{5a}(t)$, $Q_{5b}(t)$, $Q_{5c}(t)$, $Q_{5d}(t)$, $Q_{5e}(t)$) deviates from the predetermined, time-dependent change profile.

10 Claims, 3 Drawing Sheets

(51) Int. Cl.
*G01F 15/00* (2006.01)
*G01F 25/00* (2006.01)

(56) References Cited

FOREIGN PATENT DOCUMENTS

| | | | |
|---|---|---|---|
| DE | 19706564 | A1 | 8/1998 |
| DE | 19942122 | A1 | 3/2001 |
| EP | 0646781 | A2 | 4/1995 |
| EP | 0845118 | B1 | 11/2001 |
| EP | 0853775 | B1 | 3/2003 |
| JP | 9-61283 | A | 3/1997 |
| JP | 2002-39827 | A | 2/2002 |
| WO | 97/07444 | A2 | 2/1997 |
| WO | 98/06016 | A1 | 2/1998 |

OTHER PUBLICATIONS

Machine Translation of the description of DE 19942122 published Mar. 2001, three pages.*
German Search Report in corresponding German Application No. 10 2009 046 758.0, dated Jun. 25, 2010.
International Search Report in corresponding PCT Application No. PCT/EP2010/064996, dated Mar. 24, 2011.
International Preliminary Report on Patentability in corresponding PCT Application No. PCT/EP2010/064996, dated Jun. 21, 2012.

* cited by examiner

SELF-MONITORING FLOW MEASURING ARRANGEMENT AND METHOD FOR ITS OPERATION

TECHNICAL FIELD

The invention relates to a self-monitoring flow measuring arrangement with a pipeline system flowed-through by a medium, and at least one flow measuring device installed at a measuring location in the pipeline system for measuring the flow rate of the medium at its measuring location.

BACKGROUND DISCUSSION

Flow measuring arrangements are in use in a large number of industrial plants, as well as in the water and waste water industries, and are applied there in pipeline systems, for example for measuring flow rates and/or measured variables derived therefrom, for process control or for detecting leaks.

In the context of process control, control devices, for example, pumps or valves, are applied for maintaining desired flow rates or for controlling desired flow quantities. These are set so as to be optimal for the particular plant based on flows measured with the flow measuring devices.

As regards safety, it is in such case of special importance, that the flow measuring devices work faultlessly and errors in given cases occurring can immediately be recognized and removed.

The operating of the control devices occurs based on control parameters, which are ascertained for the particular process. In EP 0 853 775 B1 and EP 0 845 118 B1, methods for determining such control parameters are described, in the case of which a process variable to be measured is actively varied by an exciter system according to a ramp function, and based on the measured values of the process variable measured during this, the control parameters are calculated.

Furthermore, flow measuring arrangements are used for detecting leaks in pipeline systems. In such case, flow measurements are performed at at least two different measuring locations within the pipeline system, through which the entire quantity of medium flows. Based on these flow measurements at each of the two measurement locations, total quantities of medium flowing through in a predetermined period of time, e.g. their total mass or their total volume, are determined, and based on a comparison of the two amounts of medium, it is detected whether between the two measuring locations, medium has been lost. Also here, a reliable leak detection can only be assured, when it is assured that the two flow measuring devices work without problem.

In order to assure a secure and reliable measuring of the flow especially in safety-relevant applications and/or in the case of very long periods of use of the flow measuring devices, it is generally desirable to subject the measuring arrangement sporadically, regularly or as needed to a function checking, For this, users prefer automatic function checking, in the case of which the measuring arrangement is automatically able to check its functional ability.

In such case, it is of importance to register errors occurring in the flow measuring arrangement as promptly as possible, and to indicate these to the user, in order to enable the user to be able react rapidly and reliably in a manner directed toward the safety of the plant and its employees. In such case, it is especially relevant to detect errors, which lead to a flow measuring device permanently displaying a constant measured value of flow deviating from the actually present flow, which changes under circumstances over time. This error, frequently referred to as a "frozen" measured value, can, especially in the case of flow measurements relevant for process control, lead to catastrophic consequences. This error is especially very difficult to recognize and in part can only be recognized fairly late—possibly even only based on potentially dangerous consequences—when the frozen measured value lies in a range allowable for the flow in normal operation of the plant, or even corresponds to a predetermined desired value.

The detection of this error is especially highly relevant in the case of applications, in which the flow measuring device is used to monitor the maintaining of a predetermined desired value of flow at the measuring location. Here, if the measured value would freeze—for example, due to a malfunction of the measuring device electronics—at a value corresponding to the desired value, the malfunction could possibly remain undiscovered for a lengthy amount of time.

In U.S. Pat. No. 7,255,012 B2, a flow measuring arrangement is described with an iris-type diaphragm installed in the measuring tube and having an adjustable diaphragm opening. The diaphragm serves as a valve, via which a desired flow through the measuring tube is set. In this regard, the differential pressure falling across the diaphragm is measured, and flow is determined therefrom. The measured flow is used in a feedback loop to adjust the diaphragm opening in such a manner that the desired flow is present.

Moreover, a diagnostic method for this flow measuring arrangement is described, in the case of which the degree of closing of the diaphragm is changed for an instant, and the change in the measured pressure difference connected therewith is measured.

SUMMARY OF THE INVENTION

An object of the invention is to provide a self-monitoring flow measuring arrangement, and a method for its operation, offering a high degree of measurement safety and reliability.

For this, the invention resides in a self-monitoring flow measuring arrangement, with
  a pipeline system flowed through by a medium,
  a control device installed in the pipeline system on the inlet side, which varies a flow rate of the total medium flowing into the pipeline system according to a predetermined, time-dependent periodic change profile,
  at least one flow measuring device installed in the pipeline system,
    which is located at a measuring location, which is located downstream of the control device in the flow direction, and through which the entire medium flowing through the pipeline system flows, and
    which measures the flow rate of the medium at the measuring location, and
  a monitoring unit,
    which, based on the predetermined, time-dependent periodic change profile and the flow rate measured at the measuring locations, monitors whether the measured flow rates follow the predetermined, time-dependent periodic change profile, and
    outputs an error report, when at least one of the measured flow rates deviates from the predetermined, time-dependent change profile.

In an embodiment, the control system is a pump.
In an additional embodiment, the change profile is ramp-shaped.
In an additional embodiment
  a desired value for the flow rate of the total medium flowing into the pipeline system is predetermined, and the control system varies the flow rate according to the predetermined, time-dependent periodic change profile, especially a ramp-shaped change profile, around the desired value.

Additionally, the invention includes a method for operation of a flow measuring arrangement of the invention, in the case of which a bandwidth is predetermined, within which the measured flow rates should follow the predetermined change profile, and the error report is output, as soon as at least one of the measured flow rates lies outside of the bandwidth.

As an alternative to this, the invention includes a method for operation of a flow measuring arrangement of the invention, in the case of which, based on the measured flow rates, it is monitored whether these have at least one characteristic property to be expected due to the predetermined change profile, and a deviation of the measured rate of flow measured with the particular flow measuring device from the predetermined change profile is detected, when the corresponding property of the measured rate of flow is absent or deviates from the characteristic property to be expected.

In an embodiment of the latter method, one of the characteristic properties is a time interval between consecutive maxima and minima of the measured flow rate.

In an alternative or additional embodiment of the latter method, one of the characteristic properties is a difference between flow rate measured values of consecutive maxima and minima of the measured flow rate.

Additionally, the invention includes a method for operation of a flow measuring arrangement of the invention performable alternatively or supplementally to the stated method, wherein
- a rate of change for at least one of the measured flow rates is determined, and
- a deviation of one or more of these measured flow rates from the change profile is detected, when the rate of change of the respective measured flow rate deviates from a rate of change to be expected according to the change profile.

Additionally, the invention includes a method for detecting leaks in the pipeline system of a flow measuring arrangement of the invention, which has at least two flow measuring devices, wherein,
- based on flow rates measured over a period of time by two of the flow measuring devices installed in the pipeline system, total quantity of medium flowing through the pipeline system past the two associated measuring locations in the period of time is determined,
- it is checked, whether the two quantities of medium deviate from one another,
- it is checked, whether the flow rates measured during the period of time by the two flow measuring devices both follow the predetermined, time-dependent periodic change profile during the period of time, and
- a leak in the pipeline system located between the two associated measuring locations is diagnosed, when the two quantities of medium deviate from one another and the flow rates measured by the two flow measuring devices during the period of time both follow the predetermined, time-dependent change profile.

BRIEF DESCRIPTION OF THE DRAWINGS

The invention and other advantages will now be explained in greater detail on the basis of the appended drawing, in which three examples of an embodiment are presented; equal elements are provided in the figures with equal reference characters. The figures of the drawing show as follows.

DETAILED DISCUSSION IN CONJUNCTION WITH THE DRAWINGS

Figure 1:
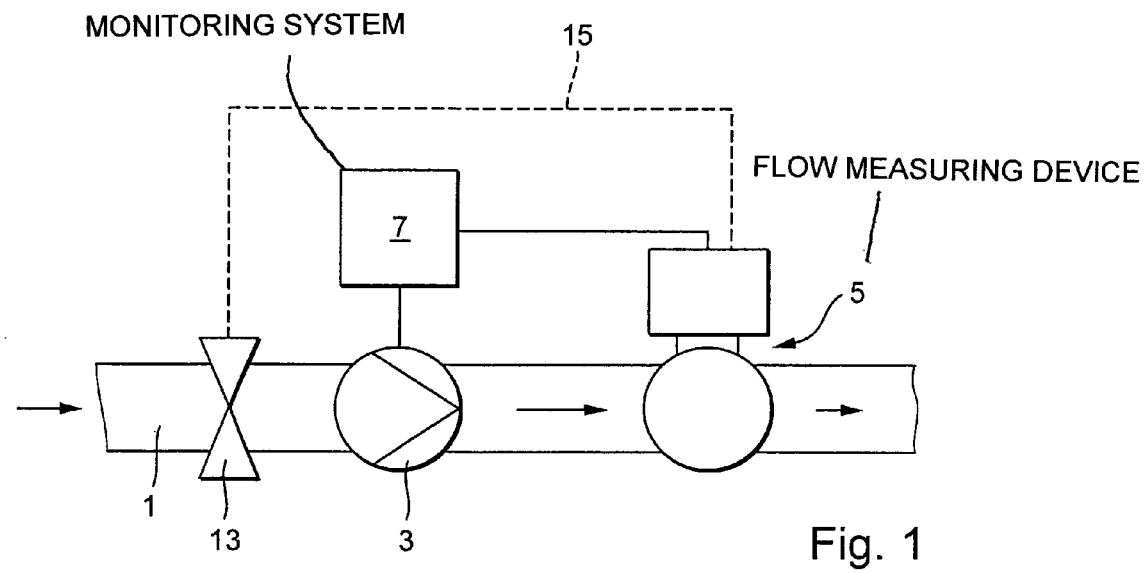
FIG. 1 is a schematic representation of a self-monitoring flow measuring arrangement with a flow measuring device installed in a simple pipeline system.

FIG. 1 shows a schematic representation of a self-monitoring flow measuring arrangement of the invention for measuring a flow of a medium through a pipeline system 1.

In the case illustrated here, the pipeline system 1 has a single pipe, into which the medium flows on the inlet side and from which the medium flows out on the outlet side. The flow direction is shown in FIG. 1 via arrows.

According to the invention, the flow measuring arrangement includes a control device 3, at least one flow measuring device 5 and a monitoring system 7.

The control device 3 is inserted into the pipeline system 1 on the inlet side, and serves to vary a flow rate of the total medium flowing into the pipeline system 1 according to a predetermined, time-dependent periodic change profile. The flow rate can, as a mass flow rate, be given in mass of medium per unit time, or, as a volume flow rate, be given in volume of medium per unit time. The changes in the flow rate impressed by the change profile have, for example, values in the order of magnitude of +/−1% of the flow rate, onto which they are superimposed. The control device 3 is preferably a pump operated as a function of the time-dependent change profile. Alternatively, however, a correspondingly operated valve can also be applied. These synthetically impressed changes in the flow rate continue in the pipeline system 1 and accordingly occur with a time delay at each position, through which the entire quantity of the medium flows, within the pipeline system 1 lying downstream of the control device 3 in the flow direction.

Figure 2:
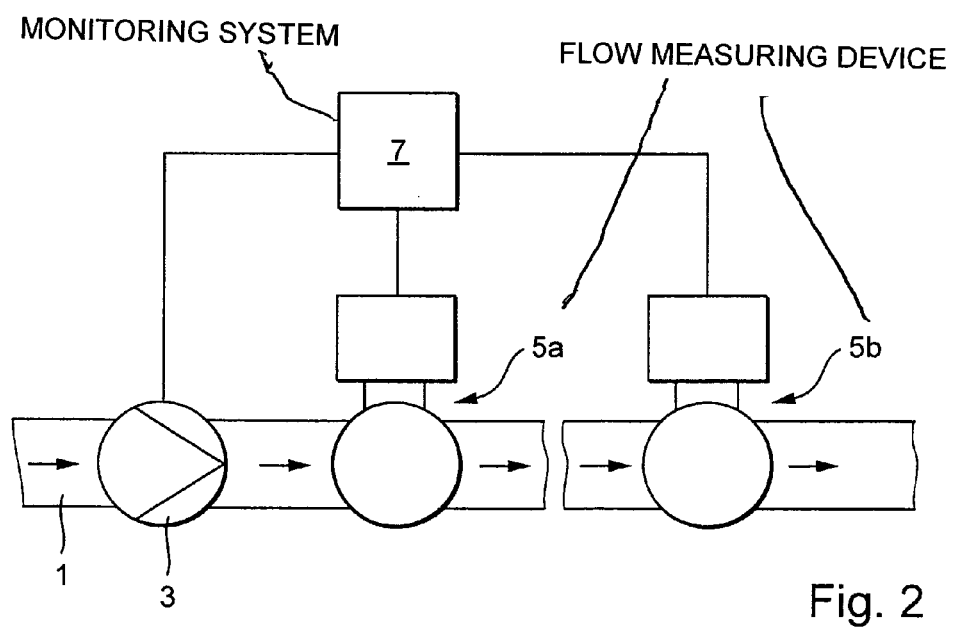
FIG. 2 is a schematic representation of a self-monitoring flow measuring arrangement with two flow measuring devices installed in a simple pipeline system.
Figure 3:
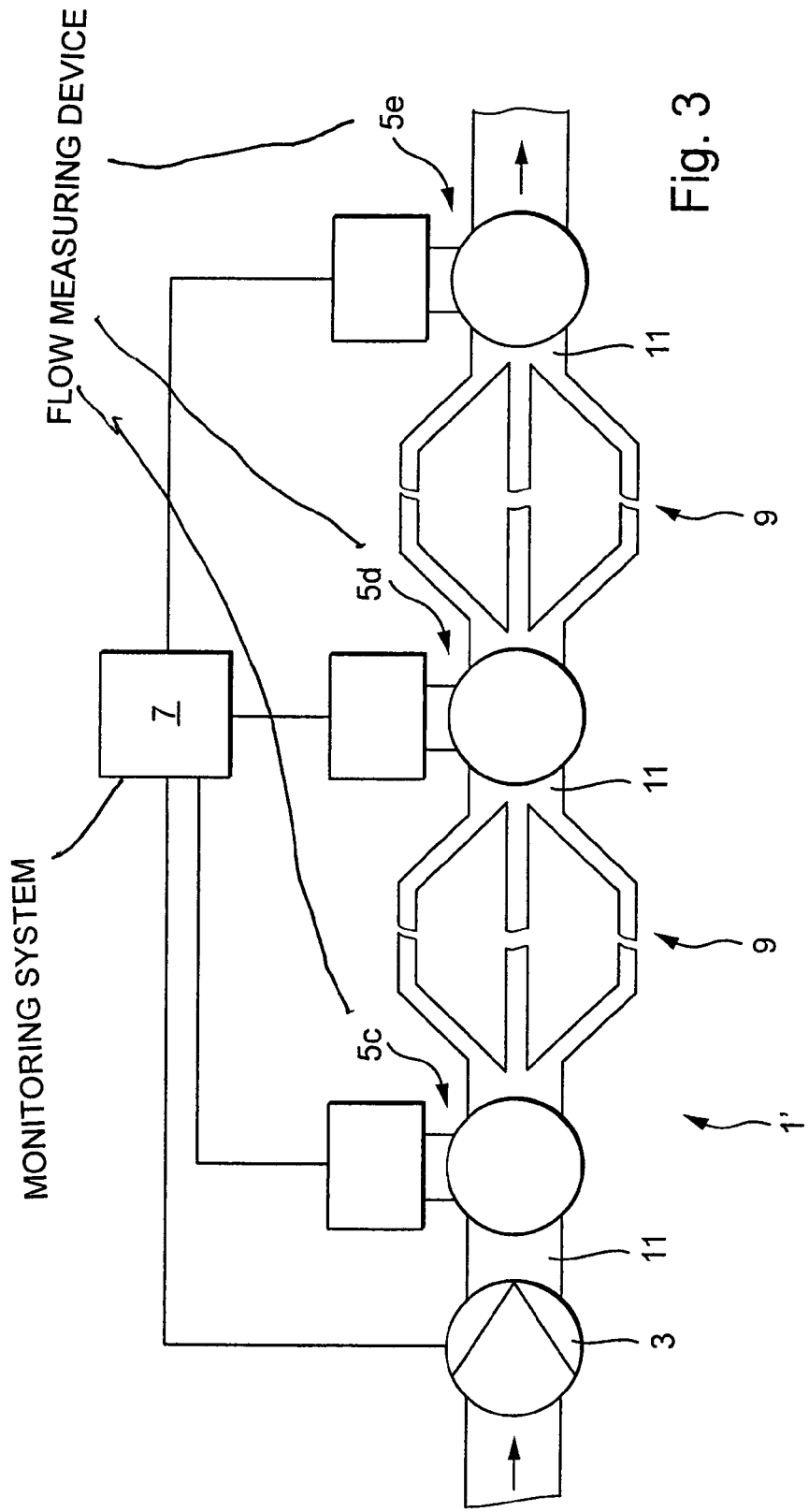
FIG. 3 is a schematic representation of a self-monitoring flow measuring arrangement with three flow measuring devices installed in a complex pipeline system.

In the example of an embodiment illustrated in FIG. 1, a single flow measuring device 5 is provided. FIG. 2 shows a further example of an embodiment of the invention, in the case of which flow measuring devices 5a, 5b are inserted in the pipeline system 1—here likewise only involving one pipe—at two different measuring locations behind the control system 3 in the flow direction. FIG. 3 shows a further example of an embodiment with a markedly more complexly constructed pipeline system 1', which here has two branchings 9 (shown here by way of example), in which the medium in each case supplied via a trunk pipe 11 is divided among different branches and then routed back to a further trunk pipe 11. Through the trunk pipes 11 in each case flows the entirety of the medium supplied to pipeline system 1'. In this pipeline system 1', flow measuring devices 5c, 5d, 5e are provided at three different measuring locations. The first flow measuring device 5c is located directly downstream of the control device 3, the second flow measuring device 5d is located in the trunk pipe 11 downstream of the first branching 9, and the third flow measuring device 5 is located in the trunk pipe 11 downstream of the second branching 9.

Suitable as flow measuring devices 5, 5a, 5b, 5c, 5d, 5e are all conventional flow measuring devices, such as pressure difference flow measuring devices working according to the differential pressure method, vortex flow measuring devices, magneto-inductive flow measuring devices, Coriolis flow measuring devices or ultrasonic flow measuring devices. Such flow measuring devices are available, for example, from the assignee.

The flow measuring devices 5, 5a, 5b, 5c, 5d, 5e are in each case located at a measuring location situated behind the control device 3 in the flow direction. The entire medium flowing through the pipeline system 1, or 1' flows through each measuring location. The flow measuring devices 5, 5a, 5b, 5c, 5d, 5e in each case measure the flow rate of the medium at their measuring location. The flow rate can be determined in the form of a mass flow rate or a volume flow rate. Additionally, for measuring the flow rate, the flow measuring devices 5, 5a, 5b, 5c, 5d, 5e can, depending on application, also determine other measured variables of flow, such as, for example, a volume of medium passing the measuring location over a predetermined period of time, or a mass of medium passing the measuring location over a predetermined period of time.

To the extent that the control device 3 and the flow measuring devices 5, 5a, 5b, 5c, 5d, 5e work without problem, the flow rates measured with the flow measuring devices 5, 5a, 5b, 5c, 5d, 5e follow the predetermined time-dependent periodic change profile synthetically impressed by the control device 3. If one of the measured flow rates deviates from the predetermined time-dependent change profile, an error is then present in the flow measuring arrangement.

The self-monitoring of the flow measuring arrangements of the invention is done by the monitoring unit 7 monitoring, based on the predetermined time-dependent change profile and the flow rates measured at the measuring locations, whether the measured flow rates follow the predetermined time-dependent change profile, and outputting an error report, when at least one of the measured flow rates deviates from the predetermined time-dependent change profile.

For this purpose, the measured flow rates of the flow measuring devices 5, 5a and 5b and 5c, 5d and 5e, as the case may be, as well as the time-dependent change profile are fed to the monitoring unit 7. In such case, the monitoring unit 7 can be an independent unit, which is connected to the flow measuring device 5, or to the flow measuring devices 5a and 5b or 5c, 5d and 5e, or it can be a component of one of the flow measuring devices 5, 5a, 5b, 5c, 5d, 5e.

Preferably, the monitoring unit 7 is additionally also connected to the control device 3. This offers the advantage, that controlling of the control device 3 can be performed directly by the monitoring unit 7. Alternatively, however, the predetermined change profile can also be stored in a memory provided in the monitoring unit 7.

The time-dependent change profile has, for example, a ramp form, according to which the flow rate can be moved up and down around a predetermined desired value or an input flow rate predetermined by the particular application and under circumstances also variable in time.

Alternatively, other periodic change profiles can, of course, also be applied. Preferably, change profiles with continuously variable flow rate are applied. This offers the advantage that also the flow rates measured with the flow measuring devices 5, 5a, 5b, 5c, 5d, 5e continuously change, to the extent that they follow the change profile. Deviations from the change profile can accordingly be recognized very rapidly. An example for this are sinusoidal profiles.

Figure 4:
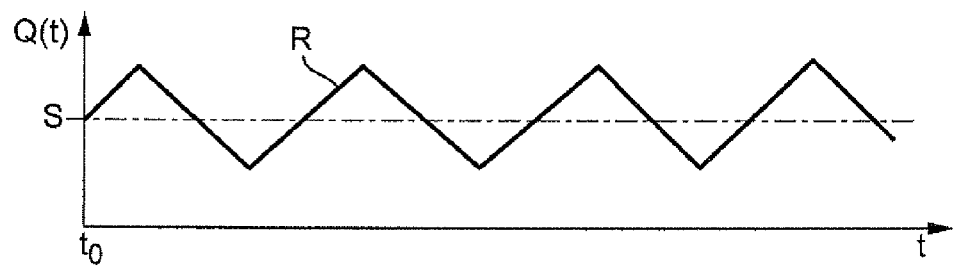
FIG. 4 is a ramp-shaped change profile varying around a desired value.

FIG. 4 shows a ramp-shaped change profile R, according to which the flow rate Q(t) is varied about a predetermined constant desired value S. The desired value S can be set, for example, via an element 13 (preferably a controllable element 13), e.g. a valve, inserted before the control device 3 in the flow direction, or directly by the control device 3 itself. Preferably, for this purpose, a control loop is provided, in which a flow measuring device measures the flow rate behind the controllable element 13 or behind the control device 3, and controls the controllable element 13 or the control device 3 as a function of the measured flow rate. For this, one of the flow measuring devices 5, 5a, 5b, 5c, 5d, 5e of the flow measuring arrangement of the invention can, for example, be used. This is shown by way of example in FIG. 1, where flow measuring device 5 is connected for this purpose via the feedback connection 15 (drawn in dashed lines) with the element 13. The control loop can, however, also be a control loop completely separate from the flow measuring arrangement of the invention and having a separate flow measuring device (not shown here).

Figure 5:
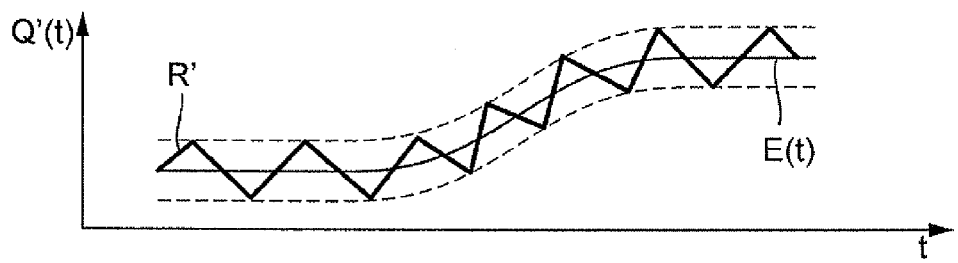
FIG. 5 is a ramp-shaped change profile varying around a variable input flow rate.

FIG. 5 shows a time-dependent, ramp-shaped change profile R', in the case of which the flow rate Q'(t) is increased and decreased around an input flow rate E(t) which is variable in time and predetermined by the application.

The monitoring unit 7 monitors whether the flow rates $Q_5(t)$, $Q_{5a}(t)$, $Q_{5b}(t)$, $Q_{5c}(t)$, $Q_{5d}(t)$, or $Q_{5e}(t)$ measured with the flow measuring devices 5, 5a, 5b, 5c, 5d or 5e follow the predetermined change profile. This is subsequently explained first using the example of the flow measuring arrangement illustrated in FIG. 1 and the ramp-shaped change profile R illustrated in FIG. 4.

Figure 6:
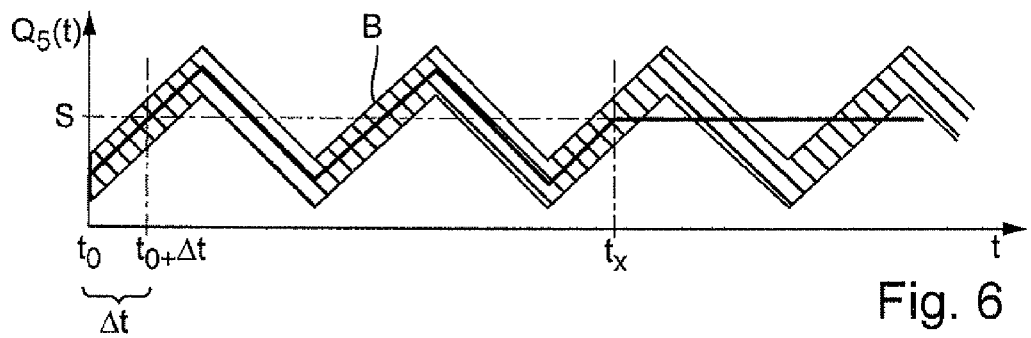
FIG. 6 is an example of a flow rate measured with the flow measuring device of the arrangement illustrated in FIG. 1 making use of the change profile illustrated in FIG. 4.

FIG. 6 shows for this purpose an example of a measured rate of flow $Q_5(t)$ measured with the flow measuring device 5, which occurs during use of the change profile R illustrated in FIG. 4, wherein the flow measuring arrangement works without problem from the point in time $t_0$ up to the point in time $t_x$, and the measured value of the flow measuring device 5 becomes frozen at the desired value S from the point in time $t_x$. In such case, the same time scale was used in FIG. 4 and FIG. 6.

Up to the point in time $t_x$, the measured rate of flow $Q_5(t)$ has the same periodic—and here ramp-shaped—curve as the change profile R. It is, however, offset in comparison to the change profile R by a time difference $\Delta t$ dependent on the flow, the pipeline dimensions and the distance between control device 3 and flow measuring device 5. The time difference $\Delta t$ can be experimentally determined beforehand, or it can be ascertained based on the time behavior of the flow rate $Q_5(t)$ measured in the case of a measuring arrangement working without problem and the time dependence of the change profile. If the time difference $\Delta t$ is greater than the period T of the change profile, then:

$$\Delta t = nT + \Delta t_R,$$

wherein n is a whole number greater than or equal to 1 and $\Delta t_R$ refers to the modular remainder. In this case, based on the measured flow rate—here $Q_5(t)$—naturally only the modular remainder $\Delta t_R$ can be determined.

After the point in time $t_x$, the measured rate of flow $Q_5(t)$ is constant and is here equal to the desired value S.

The monitoring preferably occurs by using a predetermined bandwidth B, within which the measured flow rates $Q_5(t)$ must follow the predetermined change profile R. Such a bandwidth B is presented in FIG. 6 with cross-hatching. The temporal progression of bandwidth B is determined based on the change profile R and the time difference $\Delta t$. If the time difference $\Delta t$ is greater than a period T, it then suffices to use the time difference remainder $\Delta t_R$ instead of the time difference $\Delta t$ for this determining, since the change profile R is periodic.

As soon as the flow Q5(t) measured with the flow measuring device 5 lies outside the bandwidth B, this is recognized by the monitoring unit 7 as a deviation from the predetermined change profile R and a corresponding error report is output.

Alternatively, other monitoring algorithms can naturally also be applied. Thus, a deviation from the predetermined change profile can also be monitored, for example, by monitoring the occurrence of at least one characteristic property of the measured rate of flow Q5(t) to be expected due to the predetermined change profile R. In such case, the monitoring is naturally all the more effective, the greater the number of different properties monitored.

Characteristic properties, are, for example, time intervals between consecutive maxima and minima of the measured flow rate $Q_5$(t), as well as differences between flow rate measured values of consecutive maxima and minima of the measured flow rate $Q_5$(t). For this purpose, for example, consecutive maxima and minima of the measured flow rate Q5(t) can be determined. If the time intervals between consecutive maxima and minima of the measured flow rate Q5(t) deviate from the corresponding time intervals of the predetermined change profile R, the measured flow rate $Q_5$(t) no longer follows the change profile R. If differences between the flow rate of measured values of consecutive maxima and minima of the measured flow rate Q5(t) deviate from the corresponding differences between the extrema of the predetermined change profile R, the measured flow rate $Q_5$(t) no longer follows the change profile R. If the measured flow rate $Q_5$(t) no longer exhibits any detectable extrema, a deviation from the predetermined change profile is likewise present. The latter arises especially in the case in FIG. 6 of frozen measured values occuring from the point in time $t_x$. For monitoring the characteristic properties described here, knowledge of the time difference $\Delta t$, or the time difference remainder $\Delta t_R$ is not required.

Another variant comprises monitoring variables derived from the change profile R and analogously from the measured flow rates $Q_5$(t), e.g. their rate of change. In the case of monitoring based on the rates of change, the time difference $\Delta t$ or the time difference remainder $\Delta t_R$ between the change profile R and the flow rate $Q_5$(t) must be taken into consideration.

As soon as a deviation of the measured flow rate $Q_5$(t) is detected, an error report is output, which displays the presence of a deviation. This form of self-monitoring of the flow measuring arrangement includes in such case both monitoring the control device 3 as well as also monitoring the flow measuring device 5. A failure of control device 3 leads to a deviation of the measured flow rate $Q_5$(t) from the predetermined change profile R, just as much as failures of the flow measuring device 5 itself. Both are immediately recognized by the arrangement of the invention.

The initially described error of frozen measured values leads here directly to a deviation from the change profile R and therewith to an error report.

In the case of flow measuring arrangements of the invention having two or more flow measuring devices—here, for example, the flow measuring devices 5a and 5b, or 5c, 5d and 5e—the monitoring naturally occurs completely analogously and in parallel for each of the flow measuring devices 5a and 5b, or 5c, 5d and 5e. In this case, an error report is always output as soon as at least one of the measured flow rates $Q_{5a}$(t) or $Q_{5b}$(t), or $Q_{5c}$(t), $Q_{5d}$(t), or $Q_{5e}$(t) deviates from the change profile predetermined for the entire arrangement.

In such case, for the monitoring, for individual flow measuring devices or for all provided flow measuring devices 5a and/or 5b, or 5c, 5d and/or 5e, an associated bandwidth B can in each case be defined, within which the measured rate of flow $Q_{5a}$(t) and/or $Q_{5b}$(t), or $Q_{5c}$(t), $Q_{5d}$(t), and/or $Q_{5e}$(t) measured with the respective flow measuring device 5a and/or 5b, or 5c, 5d and/or 5e is to follow the change profile. In this case, an error report is output as soon as at least one of the measured flow rates $Q_{5a}$(t) or $Q_{5b}$(t), or $Q_{5c}$(t), $Q_{5d}$(t), or $Q_{5e}$(t) lies outside the bandwidth B defined therefor.

Via the described monitoring, practically the entire arrangement is monitored automatically. In such case, both malfunctions of individual flow measuring devices 5, 5a, 5b, 5c, 5d, or 5e, such as, for example, a failure or a frozen measured value, as well as also malfunctions of control device 3, as well as pipeline breaks present upstream of the respective flow measuring device 5, 5a, 5b, 5c, 5d, or 5e, lead directly to an error report.

If the monitoring occurs based on an allowable bandwidth B for the measured flow rates, leaks present upstream of the respective flow measuring device 5, 5a, 5b, 5c, 5d, or 5e, which lead to a noticeably reduced flow rate downstream from the leak, as well as deviations from a desired value S (in given cases predetermined) for the flow rate, then directly lead to the triggering of the error report.

In the case of flow measuring arrangements with two or more flow measuring devices 5a and 5b, or 5c, 5d and 5e, in the case of the presence of a deviation between at least one of the measured flow rates $Q_{5a}$(t) or $Q_{5b}$(t), or $Q_{5c}$(t), $Q_{5d}$(t), or $Q_{5e}$(t), and the predetermined time change profile, it is preferably checked, which of the installed flow measuring devices 5a, 5b, 5c, 5d, 5e is measuring these flow rates $Q_{5a}$(t) or $Q_{5b}$(t), or $Q_{5c}$(t), $Q_{5d}$(t), or $Q_{5e}$(t) differing from the predetermined time-dependent change profile, and an error report is output, which displays these flow measuring devices 5a or 5b, or 5c, 5d or 5e, to the extent that at least one of the flow measuring devices 5a or 5b, or 5c, 5d or 5e of the arrangement measures a flow rate $Q_{5a}$(t) or $Q_{5b}$(t), or. $Q_{5b}$(t), $Q_{5d}$(t), or $Q_{5e}$(t), which varies corresponding to the predetermined time-dependent change profile. From this, it is directly recognizable to the user, that the arrangement must be checked in the region of the flow measuring devices 5a or 5b, or 5c, 5d or 5e referenced in the error report, but that the remaining components of the arrangement, especially the control device 3, however, display no error detectable in the described manner.

If all flow measuring devices 5a and 5b, or 5c, 5d and 5e measure a rate of flow deviating from the change profile, this is then preferably likewise displayed by a corresponding report. In this case, the cause for the deviations can, however, also be a malfunction of the control device 3 or of the control loop in given cases present for adjusting the desired value S for the flow.

Arrangements with two or more flow measuring devices 5a and 5b, or 5c, 5d and 5e, are additionally reliably able to diagnose also smaller leaks, which do not to lead a drastic change of the flow rate in the following sections of pipeline system 1, 1'.

For this, it is preferable to proceed in such a manner that, based on measured flow rates $Q_{5a}$(t) and $Q_{5b}$(t), or $Q_{5c}$(t) and $Q_{5d}$(t), or $Q_{5c}$(t) and $Q_{5e}$(t), or $Q_{5d}$(t) and $Q_{5e}$(t) measured over a period of time by two of the flow measuring devices 5a and 5b, or 5c and 5d or 5c and 5e or 5d and 5e installed in pipeline system 1, 1', which measure the total quantity of medium flowing through the pipeline system 1, 1' past the two associated measuring locations in the period of time, that is to say, measure the volume or mass of the medium, it is determined and is checked whether the two amounts of medium deviate from one another. This deviation can be caused both by a leak as well as also by defective measurement results of one of the two flow measuring devices 5a and 5b, or 5c and 5d, or 5c and 5e, or 5d and 5e. Accordingly, it is additionally checked, whether the measured flow rates $Q_{5a}(t)$ and $Q_{5b}(t)$, or $Q_{5c}(t)$ and $Q_{5d}(t)$, or $Q_{5c}(t)$ and $Q_{5e}(t)$, or $Q_{5d}(t)$ and $Q_{5e}(t)$ measured during the period of time by the two flow measuring devices 5a and 5b, or 5c and 5d or 5c and 5e or 5d and 5e both follow the predetermined time-dependent change profile during the period of time. If this is the case, the two flow measuring devices 5a and 5b, or 5c and 5d or 5c and 5e or 5d and 5e and the control device 3 are working without problem. Correspondingly, the two different quantities of medium can be attributed without doubt to a leak located between the two associated measuring locations in the pipeline system 1, 1', which is then diagnosed by the arrangement. Additionally, for diagnosis of the leak and its spatial boundaries, by the position of the two associated flow measuring devices 5a and 5b, or 5c and 5d or 5c and 5e or 5d and 5e, based on the size of the difference between the two different quantities of medium, an estimation of the size of the leak can be given, which is displayed to the user, preferably together with the two other data.

The invention claimed is:

1. A self-monitoring flow measuring arrangement, comprising:
 a pipeline system flowed through by a medium;
 a control device installed in said pipeline system on the inlet side, which varies a flow rate of the total medium flowing into said pipeline system according to a predetermined, time-dependent periodic change profile, at least one flow measuring device installed in said pipeline system, which is located at a measuring location, which is located downstream said control device in the flow direction, and through which the medium flowing through said pipeline system flows, and which measures the flow rate of the medium at the measuring location; and
 a monitoring unit, which, based on said predetermined, time-dependent periodic change profile and the flow rates measured at said measuring location, monitors whether said measured flow rates follow said predetermined, time-dependent periodic change profile, and outputs an error report, when at least one of said measured flow rates deviates from said predetermined, time-dependent periodic change profile.

2. The self-monitoring flow measuring arrangement as claimed in claim 1, wherein:
 said control device is a pump.

3. The self-monitoring flow measuring arrangement as claimed in claim 1, wherein:
 the change profile is ramp-shaped.

4. The self-monitoring flow measuring arrangement as claimed in claim 1, wherein:
 a desired value for the flow rate of the total medium flowing into the pipeline system is predetermined; and
 said control device varies the flow rate according to the predetermined, time-dependent periodic change profile.

5. A method for operation of a flow measuring arrangement includes a pipeline system flowed through by a medium;
 a control device installed in said pipeline system on the inlet side, which varies a flow rate of the total medium flowing into said pipeline system according to a predetermined, time-dependent periodic change profile, at least one flow measuring device installed in said pipeline system, which is located at a measuring location, which is located downstream of said control device in the flow direction, and through which the medium flowing through said pipeline system flows, and which measures the flow rate of the medium at the measuring location; and a monitoring unit, which, based on said predetermined, time-dependent periodic change profile and the flow rates measured at said measuring location, monitors whether said measured flow rates follow said predetermined, time-dependent periodic change profile, and outputs an error report, when at least one of said measured flow rates deviates from said predetermined, time-dependent periodic change profile, the method comprising the steps of:
 predetermining a bandwidth, within which the measured flow rates should follow the predetermined, periodic change profile; and
 outputting an error report as soon as at least one of the measured flow rates lies outside the bandwidth.

6. The method for operation of a flow measuring arrangement as claimed in claim 5, wherein:
 it is monitored, based on the measured flow rates, whether these have at least one characteristic property to be expected due to the predetermined, periodic change profile; and
 detecting, a deviation of the measured rate of flow measured with a particular flow measuring device from the predetermined, periodic change profile, when the at least one corresponding property of the measured rate of flow is absent or deviates from the characteristic property to be expected.

7. The method for operation of a flow measuring arrangement as claimed in claim 6, wherein:
 at least one of the characteristic properties is a time interval between consecutive maxima and minima of the measured flow rate.

8. The method for operation of a flow measuring arrangement as claimed in claim 6, wherein:
 at least one of the characteristic properties is a difference between flow rate measured values of consecutive maxima and minima of the measured flow rate.

9. The method for operation of an arrangement according to claim 6, wherein:
 a rate of change of at least one of the measured flow rates is determined; and
 a deviation of one or more of these measured flow rates from the change profile is detected when the rate of change of the respective measured flow rate deviates from a rate of change to be expected according to the change profile.

10. The method for detecting leaks in the pipeline system of a flow measuring arrangement, comprising:
 a pipeline system flowed through by a medium;
 a control device installed in said pipeline system on the inlet side, which varies a flow rate of the total medium flowing into said pipeline system according to a predetermined time-dependent periodic change profile, at least one flow measuring device installed in said pipeline system, which is located at a measuring location, which is located behind said control device in the flow direction, and through which the entire medium flowing through said pipeline system flows, and which measures the flow rate of the medium at the measuring location; and
 a monitoring unit, which, based on said predetermined time-dependent change profile and the flow rates measured at said measuring locations, monitors whether said measured flow rates follow said predetermined time-dependent change profile, and outputs an error report, when at least one of said measured flow rates deviates from said predetermined, time-dependent change profile, and which has at least two flow measuring devices, comprising the steps of:

based on flow rates measured over a period of time by two of the flow measuring devices installed in the pipeline system, total quantity of medium flowing through the pipeline system past the two associated measuring locations in the period of time is determined;

it is checked, whether the two quantities of medium deviate from one another, it is checked, whether the flow rates measured during the period of time by the two flow measuring devices both follow the predetermined time-dependent change profile during the period of time; and a leak in the pipeline system located between the two associated measuring locations is diagnosed, when the two quantities of medium deviate from one another and the flow rates measured by the two flow measuring devices during the period of time both follow the predetermined time-dependent change profile.

* * * * *